(No Model.) 2 Sheets—Sheet 1.
A. GASSINGER, Sr. & A. GASSINGER, Jr.
LATHE FOR TURNING SPIRALS.
No. 332,510. Patented Dec. 15, 1885.
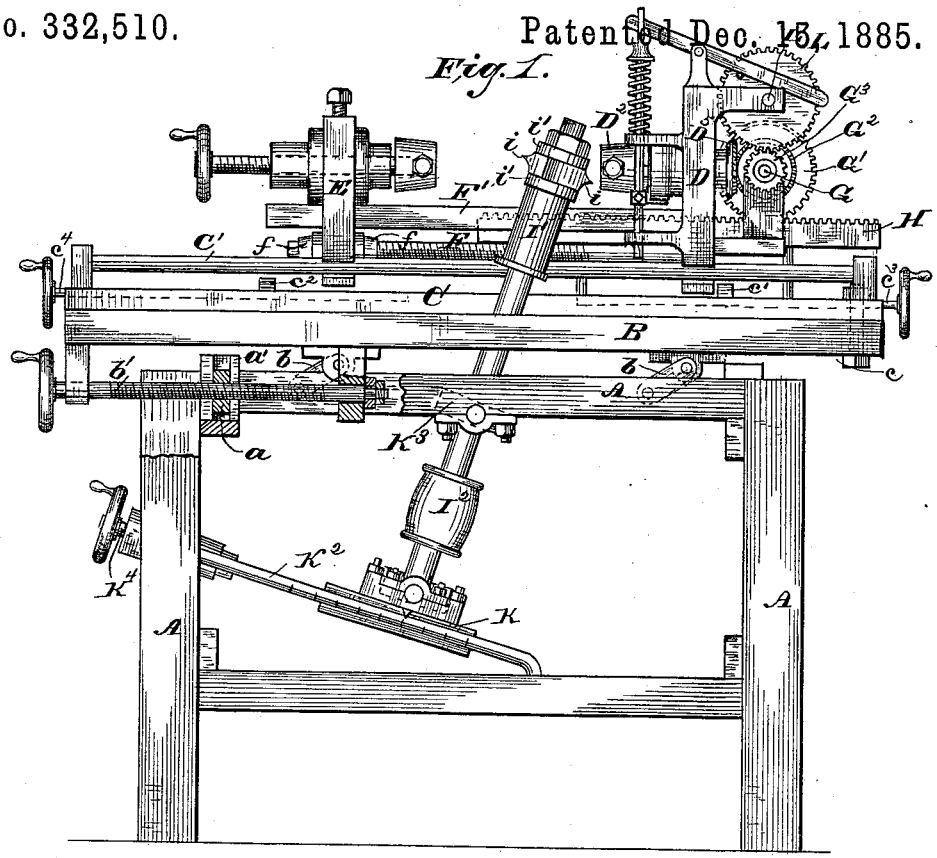
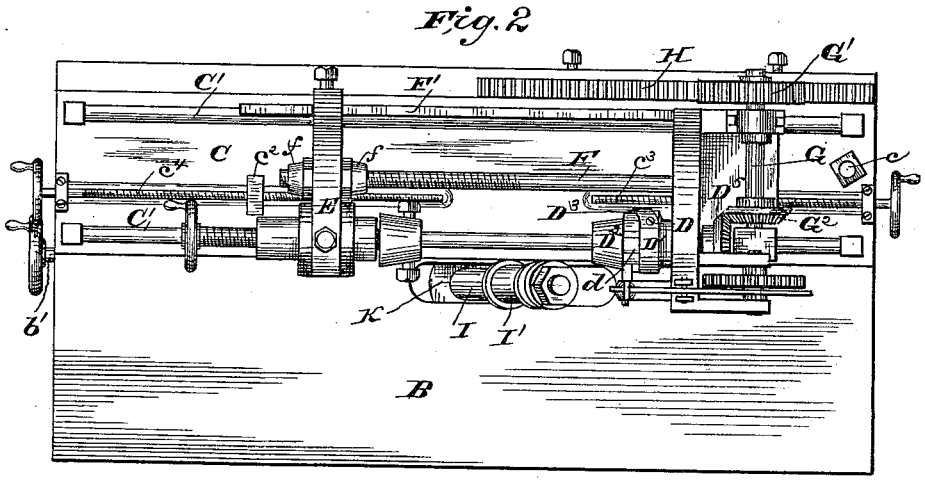
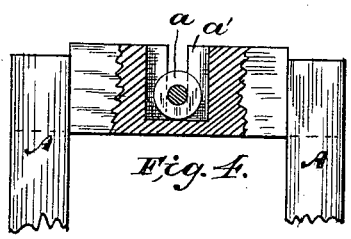

(No Model.) 2 Sheets—Sheet 2.
A. GASSINGER, Sr. & A. GASSINGER, Jr.
LATHE FOR TURNING SPIRALS.
No. 332,510. Patented Dec. 15, 1885.
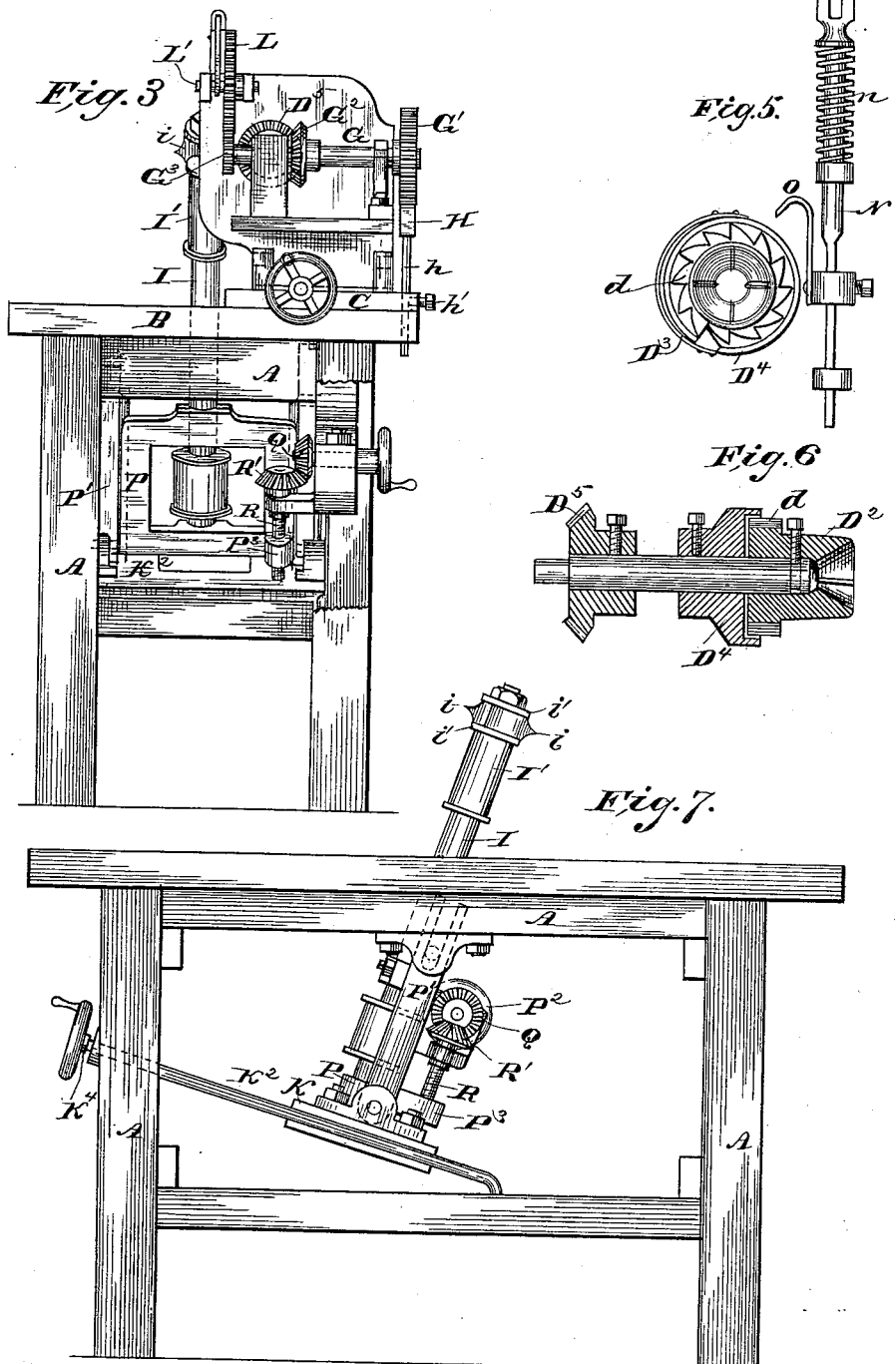
Witnesses:
E. N. Walker
Wm. C. Woodward
Inventors
August Gassinger Sr.
August Gassinger Jr.
by their Attorney

UNITED STATES PATENT OFFICE.

AUGUST GASSINGER, SR., AND AUGUST GASSINGER, JR., OF BALTIMORE, MARYLAND.

LATHE FOR TURNING SPIRALS.

SPECIFICATION forming part of Letters Patent No. 332,510, dated December 15, 1885.

Application filed August 5, 1885. Serial No. 173,620. (No model.)

*To all whom it may concern:*

Be it known that we, AUGUST GASSINGER, Sr., and AUGUST GASSINGER, Jr., subjects of the Emperor of Germany, residing at Baltimore city, and State of Maryland, have invented certain new and useful Improvements in Lathes for Turning Spirals; and we do hereby declare the following to be a full, clear, and exact description of the invention, such as will enable others skilled in the art to which it appertains to make and use the same.

This invention relates to wood-working lathes designed for turning spiral flutings on balusters, chair and table legs, and other articles.

Our improvement consists in organizing the lathe with a molding cutter-head turning on an axis parallel or tangential to the surface operated on, but oblique to the axis of the lathe, the cutter-head shaft being so mounted that its obliquity can be adjusted; also, in organizing the lathe with a traversing lathe-carriage mounted on a pivoted bed-plate, so that said carriage may be traversed past the molding cutter-head on a line corresponding to the longitudinal contour of the article under operation; also, of certain details of construction more specifically pointed out in some of the claims at the close of this specification.

In order that our invention may be clearly understood, we have illustrated in the annexed drawings, and will proceed to describe, a practical form thereof as embodied in a lathe the carriage of which is traversed by hand.

Figure 1 represents a side elevation of our improved lathe for turning spirals. Fig. 2 represents a plan view of the same. Fig. 3 represents an end view of the same, showing a modification of some of the parts hereinafter explained. Figs. 4, 5, and 6 illustrate detached parts drawn on a larger scale than that of the preceding figures. Fig. 7 illustrates the modification, also shown in Fig. 3.

The same letters of reference indicate identical parts in all the figures.

The different parts of the lathe are mounted on a suitable frame, A, which carries a platform, B, upon which the bed-plate C of the lathe-carriage rests, the bed-plate being pivoted near one end to the platform by a pivot-pin, $c$. In order that the bed-plate C and lathe-carriage may be raised or lowered, the platform B is connected to frame A by radius-bars $b\,b$, providing for its parallel adjustment, which can be effected by a screw, $b'$, journaled in bearings on said platform, and a nut, $a$, confined in a socket, $a'$, of the frame A, all as clearly shown in Fig. 1. The head-stock D and the tail-stock E of the lathe-carriage, mounted to slide on the guides or shears $C'\,C'$ of the pivoted bed-plate C, are connected together rigidly by a rod, F, between two nuts, $f\,f$, on the screw-threaded portion of which the tail-stock is clamped, thus providing for its adjustment with reference to the head-stock. They are further connected by a bar, F', which is permanently fastened to the head-stock, and passes through a hole in the tail-stock, to which it is secured by a set-screw. The tail-stock is provided with the usual adjustable dead-spindle, on which a chuck may be mounted, as shown, for centering and holding one end of the blank. The live-spindle D' carries a chuck, $D^2$, which is driven by the live spindle through the medium of a pawl, $D^3$, mounted on a fixed collar or sleeve, $D^4$, of said spindle, and engaging a ring of ratchet-teeth, $d$, on the chuck. Thus the chuck $D^2$ may be adjusted circularly for setting or advancing the blank each time a spiral groove has been cut. Pawl $D^3$ has a stiff spring shank, so as to drive the chuck positively in one direction, and by friction in the other direction. The live-spindle carries a bevel-wheel, $D^5$, driven by a bevel-wheel, $G^2$, on the cross driving-shaft G, which is supported in suitable bearings on the head-stock, and carries a spur-wheel, G', which meshes with a rack, H, mounted on the pivoted bed-plate C of the lathe. It will be observed that on sliding the lathe-carriage along the bed-plate the live-spindle will be turned by the described gearing.

In order that the live-spindle, and consequently the blank, may be given any required number of turns during a given travel of the lathe-carriage, a number of spur-wheels, G', differing in size and number of teeth, are furnished with each lathe, and the rack H is made vertically adjustable, so that it can be adjusted to any one of said spur-wheels. In the example shown the rack has standards $h$ passing through holes in the bed-plate, and secured thereto by set-screws $h'$, slots being cut in the edge of the platform B to accommodate said standards.

In order that the travel of the lathe-carriage may be stopped at the proper points, we provide adjustable stops $c'$ and $c^2$, which are mounted on the bed-plate C and adjusted by screws $c^3$ and $c^4$. The travel of the lathe-carriage in one direction is stopped by the tail-stock striking stop $c^2$, and its travel in the other direction is stopped by the head stock striking stop $c'$.

The cutters $i$ $i$ are secured between collars $i'$ $i'$ of the cutter-head I', on the upper end of the cutter-shaft I. The lower end of the cutter-shaft is supported in a swiveling step-bearing, K', journaled in a slide, K, mounted on inclined ways $K^2$ $K^2$ on frame A. Higher up the cutter-shaft passes through a swiveling bearing, $K^3$, journaled in boxes on the frame A. The slide K is controlled by a screw, $K^4$, by which it may be shifted for adjusting the cutter-shaft to any required inclination. A suitable slot is formed in platform B, for the passage of the cutter-shaft. The object of providing for adjustments of the cutter-shaft to different inclinations is that the cutters may run in a plane the obliquity of which shall be such that the cutting is done on a slope substantially coincident with the slope of the spiral groove to be formed. A scale may be marked on one of the ways $K^2$, and a pointer-mark on slide K, as indicated in Fig. 1, by which the operator can adjust the cutter-shaft to the required inclination for any given spiral. The cutter-shaft is driven by pulley $I^2$.

In using this machine the lathe-carriage is first adjusted to the length of the blank and the proper spur-wheel, E', put on the driving-shaft for giving the required turn or turns to the blank during the travel of the lathe-carriage, previously determined by suitable adjustment of the stops $c'$ and $c^2$. The cutter-shaft is then adjusted to the proper inclination for the spirals to be cut, and, finally, the platform is so adjusted that the horizontal axial plane of the blank intersects, when extended, the oblique plane of the cutters about centrally, so that the cut will extend about equally below and above such horizontal plane. The operation is begun by swinging the bed-plate away from the cutter-shaft and running the lathe-carriage back to stop $c^2$. The bed-plate is then swung back toward the cutter-shaft, the cutters cutting into the blank until the surface of the blank comes in contact with the collars $i'$ of the cutter-head, which determines the depth of the cut. The lathe-carriage is then pushed forward, traversing the blank past the cutter-head at the same time that it is turned on its axis by the lathe-gearing. The line of travel is determined by the longitudinal contour of the blank itself. When the lathe-carriage strikes stop $c'$, the bed-plate is again swung away from the cutter-shaft and the lathe-carriage run back to stop $c^2$. At the same time the chuck $D^2$, with the blank, is turned on the live-spindle to set the blank for the next spiral. This turning or setting of the blank may be done by hand, or it may be effected automatically by the following mechanism: Driving-shaft G carries a spur-pinion, $G^3$, which drives a spur-wheel, L, on a shaft, L', on the head-stock. Wheel L, having a stud-pin, $l$, constitutes a cam-wheel for lifting a lever, M, which is fulcrumed on the head-stock, and engages the upper end of the upright slide-rod N, which slides in guides on the face of the head-stock, and carries a spring-pawl, O, for engaging the ratchet-teeth of chuck $D^2$ at the proper time. The slide-rod is normally held elevated by the stress of a spiral spring, $n$, so that pawl O is out of engagement. The automatic setting of the blank is effected during the retrograde movement of the lathe-carriage, when the chuck $D^2$ and blank are turned by pawl $D^3$ through friction. When the slide-rod is being depressed by lever M during this retrograde movement of the lathe-carriage, pawl O turns the chuck $D^2$ and the blank on the lathe-spindles to the required extent, driving-pawl $D^3$ slipping over the ratchet-teeth, one or more, as the extent of setting may require. During the advance movements of the lathe-carriage pawl O has no effect on chuck $D^2$, because the latter is then turned at a faster rate in the same direction in which pawl O tends to turn it. The speed of cam-wheel L must be so calculated and its stud-pin so arranged that but one setting of the blank can be effected during the retrograde movement of the lathe-carriage.

Instead of mounting the bed-plate and lathe-carriage on an adjustable platform to obtain a vertical adjustment of the lathe-carriage with reference to the cutter-head, the said bed-plate and lathe-carriage may be mounted upon a fixed platform, as shown in Figs. 3 and 7. In that case the cutter-shaft is so mounted that it may be adjusted endwise. To this end it is journaled in bearings of a yoke, P, fitted on guides P' P', the lower ends of which are pivoted to the slide K, while their upper ends have each a slot, $p'$, to receive fixed stud-pins $p$ on the frame A. One of the guides P' is provided with a bracket, $P^2$, which supports a shaft carrying a bevel-wheel, Q, which meshes with a bevel-wheel, R', on the upper end of a screw-shaft, R. Screw-shaft R is supported on bracket $P^2$ and engages a nut, $P^3$, on yoke P, so that by turning screw-shaft R by bevel-wheels Q R' the yoke supporting the cutter-shaft may be raised or lowered.

We claim as our invention—

1. The combination, substantially as before set forth, of a lathe for rotating the blank, the molding cutter-head on a shaft whose axis is parallel or tangential to the surface operated on, but oblique to the axis of the blank, the swiveling bearings of said cutter-shaft, and the slide for adjusting the obliquity of the cutter-shaft.

2. The combination, substantially as before set forth, of the molding cutter-head, the traversing lathe-carriage, and the pivoted bed-plate on which the said lathe-carriage is mounted.

3. The combination, substantially as before set forth, of the pivoted bed-plate, the rack thereon, the head-stock of the lathe-carriage carrying the live-spindle, the tail-stock, and the cross driving-shaft carrying a spur-wheel meshing with the said rack and a bevel-wheel meshing with a bevel-wheel on said live-spindle.

4. The combination, substantially as before set forth, of the live spindle, the chuck thereon having a ring of teeth, the pawl for driving the chuck from said live-spindle, the slide-rod and pawl for turning the chuck in setting or advancing the blank, the spring for retracting the said slide-rod, the cam-wheel and lever for operating the slide-rod in opposition to the spring, and the spur-wheel on the cross driving-shaft on the lathe-carriage for turning the said cam-wheel.

5. The combination, substantially as before set forth, of a lathe for rotating the blank, a molding cutter-head turning on an axis parallel or tangential to the surface operated on, but oblique to the axis of the blank, and means, substantially such as described, both for adjusting the obliquity of the cutter-shaft and for adjusting the cutter-head and the axis of the lathe with reference to each other.

In testimony whereof we affix our signatures in presence of two witnesses.

AUGUST GASSINGER, Sr.
AUGUST GASSINGER, Jr.

Witnesses:
FRANZ SCHANDELLE,
ANTON BAUHAUS.